United States Patent [19]
McMahon et al.

[11] Patent Number: 5,620,296
[45] Date of Patent: Apr. 15, 1997

[54] DEVICE FOR LOADING AND CARRYING CARGO

[75] Inventors: Vincent P. J. McMahon; Brian Dries, both of Sandy, Oreg.

[73] Assignee: Toyrak Enterprises, Inc., Sandy, Oreg.

[21] Appl. No.: 552,223

[22] Filed: Nov. 2, 1995

[51] Int. Cl.$^6$ ............................................. B60P 1/64
[52] U.S. Cl. ........................... 414/498; 414/462; 414/546
[58] Field of Search .................................. 414/462, 546, 414/498

[56] References Cited

U.S. PATENT DOCUMENTS

| | | |
|---|---|---|
| 2,527,369 | 10/1950 | Meyer ..................................... 414/498 |
| 3,726,423 | 4/1973 | Miron . |
| 3,819,075 | 6/1974 | Derain . |
| 3,872,989 | 3/1975 | Smithson et al. ....................... 414/462 |
| 3,874,537 | 4/1975 | Kou . |
| 3,892,323 | 7/1975 | Corompt . |
| 3,972,433 | 8/1976 | Reed . |
| 3,984,013 | 10/1976 | Wirz . |
| 4,058,229 | 11/1977 | Triplett ................................... 414/546 |
| 4,073,396 | 2/1978 | Derain . |
| 4,132,325 | 1/1979 | Corompt . |
| 4,204,793 | 5/1980 | Lemaire . |
| 4,212,580 | 7/1980 | Fluck . |
| 4,239,438 | 12/1980 | Everson . |
| 4,274,788 | 6/1981 | Sutton . |
| 4,341,500 | 7/1982 | Laitinen . |
| 4,344,731 | 8/1982 | Visa et al. . |
| 4,453,878 | 6/1984 | Paukku . |
| 4,589,671 | 5/1986 | Boughton . |
| 4,755,098 | 7/1988 | Wulf et al. . |
| 4,902,189 | 2/1990 | Raisio . |
| 4,932,829 | 6/1990 | Miller . |
| 4,960,356 | 10/1990 | Wrenn . |
| 5,108,247 | 4/1992 | Vlaanderen . |
| 5,108,248 | 4/1992 | Murrill . |
| 5,108,252 | 4/1992 | Lougheed et al. ....................... 414/546 |
| 5,119,961 | 6/1992 | Runn ....................................... 414/563 |
| 5,123,799 | 6/1992 | Breazeale . |
| 5,213,466 | 5/1993 | Bubik . |
| 5,232,329 | 8/1993 | Livingston . |
| 5,249,910 | 10/1993 | Ball . |
| 5,259,721 | 11/1993 | Sato et al. .............................. 212/265 |
| 5,380,141 | 1/1995 | Flowers . |
| 5,393,191 | 2/1995 | Alexander . |
| 5,427,495 | 6/1995 | Vlaanderen ............................ 414/498 |

FOREIGN PATENT DOCUMENTS

| | | | |
|---|---|---|---|
| 242432 | 11/1962 | Australia .............. | 414/498 |
| 9014250 | 11/1990 | WIPO .................. | 414/498 |

OTHER PUBLICATIONS

"Mult-Lift" Brochure Submitted to PTO Apr. 12, 1991 from HIAB Cranes and Loaders, New Castle DE.

*Primary Examiner*—Thomas J. Brahan
*Attorney, Agent, or Firm*—Kolisch Hartwell Dickinson McCormack & Heuser

[57] ABSTRACT

An apparatus for loading and carrying cargo on the bed of a pickup truck includes a chassis and a drive mechanism substantially contained within the chassis. The chassis is rigidly attached to the bed of a pickup truck. The drive mechanism is connected to an arm and operable to move a distal end of the arm back and forth between an unload position near the back of the pickup truck and a load position above a forward portion of the bed of the pickup truck. The distal end of the arm can be attached to a carrier assembly which includes a rack designed to carry a specific type of cargo. A remote control unit allows the user to manually control movement of the arm between the unload and load positions.

11 Claims, 8 Drawing Sheets

DEVICE FOR LOADING AND CARRYING CARGO

FIELD OF THE INVENTION

The invention relates to cargo carriers. In particular, the invention involves an apparatus for use with a conventional pickup truck, to load and carry various types of cargo, including recreational equipment and/or vehicles, in a safe and easy manner.

BACKGROUND OF THE INVENTION

Much effort has been devoted over many years to the problem of transporting heavy equipment or cargo from place to place. In the industrial fields, specialized trucks such as dump trucks, log trucks, etc. have been designed and manufactured to carry specific types of cargo. Industrial trucks are generally large, expensive pieces of equipment which are usually dedicated to a specific type of cargo carrying function.

In the field of personal or recreational use, including but not limited to the transport of recreational vehicles such as snowmobiles, wave runners, motorcycles, boats, etc., pickup trucks with racks or trailers are commonly used. Trailers offer the advantage of providing a separable, mobile storage cart or rack when the cargo is not being used or transported. However, trailers also have numerous disadvantages. First, a trailer usually limits significantly the overall maneuverability of the pulling vehicle. Second, a trailer increases the effective length of a vehicle, thus making the vehicle difficult to park, turn and back-up. Third, a trailer blocks the lights on the pulling vehicle. Therefore, the trailer must be provided with accessory lighting to indicate braking and turning signals. Accordingly, it is preferable to carry cargo on or above a vehicle instead of on a trailer behind the vehicle.

However, a significant problem with vehicle racks is that heavy cargo items are difficult to load and securely mount on a vehicle. Thus, many different truck loading devices have been developed. In the industrial field, trucks have been designed which include structures for pulling a container from the ground onto the bed of a truck. For example, see U.S. Pat. No. 4,132,325 to Corompt, U.S. Pat. No. 4,589,671 to Boughton and U.S. Pat. No. 3,874,537 to Kou.

There are several characteristics of industrial trucks/ loaders which make them impractical for personal or recreational use. First, the trucks shown in the patents listed above are dedicated to a single function, i.e., carrying a specific type of container. In the field of personal/recreational use, it would not be practical from a cost standpoint to develop, for example, a specific vehicle (truck) for carrying wave runners. A person might have to buy one truck for carrying wave runners, another truck for carrying snowmobiles and a third truck for carrying motorcycles. Thus, the dedicated function characteristic of the industrial load carrying trucks is not practical for personal or recreational applications.

A second limitation of the industrial trucks/loaders disclosed in the patents listed above, is that they are not safe enough to be used around or operated by untrained or unskilled persons of all ages. The industrial carrier/trucks employ hydraulics or other drive mechanisms which are completely exposed and operate off and above an upper surface of the truck bed. This feature may not be a problem in industrial uses where the persons operating the trucks are skilled adult laborers. However, in the personal and recreational fields, unskilled users and even children may be around the vehicle when cargo is being loaded or unloaded. Exposed hydraulics which project and extend upward from the truck bed or other similar drive mechanisms could pose a serious danger for such persons who are often in or around the home or recreational setting.

In the field of personal or recreational cargo carriers, pickup tracks are the most commonly used vehicle. Many have tried to develop cargo loaders and carriers which can be adapted for use on a conventional pickup truck. Examples are shown in U.S. Pat. No. 4,239,438 to Everson, U.S. Pat. No. 4,274,788 to Sutton, U.S. Pat. No. 5,393,191 to Alexander and U.S. Pat. No. 4,960,356 to Wrenn. The devices shown in these patents may be referred to as "pickup racks." Prior pickup racks have several fundamental problems. First, the racks are generally specific for carrying one type of cargo, for example, a boat, snowmobile or a wave runner. Second, the racks are often quite complex with many moving parts (for example, see the '438 patent to Everson). Thus, they are relatively complex to build, install and operate. Third, none of the prior pickup racks coordinate cargo loading and carrying with a separate mobile carrier assembly. Thus, prior pickup racks do not address the problem of how to move and store the cargo on land when the cargo is not loaded on the pickup truck.

Accordingly, an important objective of the present invention is to provide a carrier/rack which can be easily and securely mounted on and dismounted from the bed of a conventional pickup truck. Use of the carrier apparatus on a pickup truck should not permanently dedicate the pickup truck to a particular carrying function.

Another object of the invention is to provide a carrier apparatus which is flexible in that interchangeable rack portions can be used to accommodate different types of cargo, for example, including but not limited to recreational vehicles such as wave runners, snowmobiles, motorcycles and boats.

A further object of the invention is to provide a carrier apparatus which includes a mobile and detachable carrier assembly to permit movement and storage of the cargo when it is not being used or transported. Thus, the apparatus should provide the separable, mobile carrier advantage of a trailer without the disadvantages of a trailer relating to decreased maneuverability and safety.

It is also an object of the invention to provide a carrier apparatus which can be used safely in a recreational setting, i.e., drive mechanics are maintained within a chassis and a control mechanism is provided for operation remote from the vehicle.

SUMMARY OF THE INVENTION

The objectives stated above and other important goals are achieved with the present invention relating to an apparatus for loading and carrying cargo on the bed of a conventional pickup truck. The apparatus includes a frame, also referred to as a chassis, equipped for easy mount and dismount on the bed of a pickup truck. A drive mechanism is connected to, and at least partially contained within, the chassis. A top plate or cover has an opening through which the proximal end of an arm is pivotally connected to the drive, mechanism. The drive mechanism is operable to move a distal end of the arm back and forth between an unload position near the back of the pickup truck and a load position above a forward portion of the bed of the pickup truck. A control unit communicates with the drive mechanism, permitting the user to manually control movement of the arm between the unload and load positions. A carrier assembly is detachable from the rest of the assembly, and includes a rack designed to carry a specific type of cargo. The carrier assembly includes a mechanism for detachably linking the carrier assembly to the distal end of the arm. In a preferred embodiment of the invention, the carrier assembly includes a generic cart designed to carry interchangeably any one of a plurality of cargo-specific racks, so the same basic apparatus can be used to carry a variety of different cargo items, including but not limited to wave runners, snowmobiles, motorcycles and boats.

DESCRIPTION OF THE INVENTION

The present invention provides an apparatus for loading and carrying cargo, particularly relatively heavy recreational vehicles such as wave runners, snowmobiles, motorcycles, boats, etc., on the bed of a conventional pickup truck. The invention may be used or retro-fitted on a pickup truck with only minor customization and without permanently dedicating the truck to a particular function. The new device provides the advantage of a trailer in that it provides a separable, mobile carrier while avoiding the disadvantages of a trailer relating to limitations on maneuverability and safely.

A preferred embodiment of the invention is illustrated in the figures and described in detail below. The preferred embodiment is designed to carry two wave runners side-by-side on the bed of a pickup truck. It will be apparent, however, that the same basic principles can be employed to carry numerous other types of cargo items.

Figure 1:
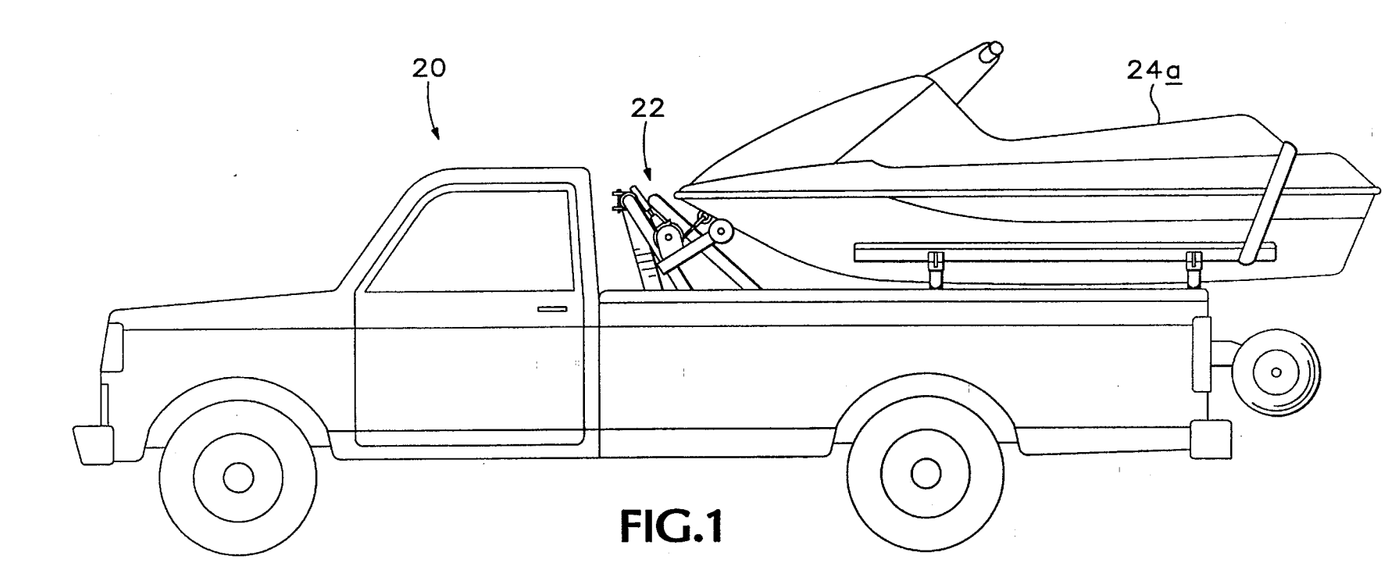
FIG. 1 is a side view of a pickup truck and carrier assembly supporting a wave runner in the loaded position.

FIG. 1 shows a side view of a pickup truck 20 with a carrier assembly 22 and a wave runner 24a loaded on the bed of pickup truck 20.

FIGS. 2A–2D show sequential side views of the carrier assembly 22 and wave runner 24a being loaded on the bed of pickup truck 20. In these figures, a portion of the side of truck 20 is cut-away so the viewer can see some of the mechanics in the bed of the pickup which facilitate loading. Specifically, a chassis (metal frame) 30 is securely mounted on the bed 31 of pickup truck 20. Mechanics for operating movement of chassis arm 32 are substantially contained within chassis 30, and will be illustrated and described in more detail below. Chassis arm 32 has an elbow 33 making it substantially L-shaped. The range of movement permitted for chassis arm 32 from an "unload position" (FIG. 2A) to a "load position" (FIG. 2D) is illustrated in these figures. The proximal end 34a of chassis arm 32 is connected pivotally to mechanics contained within chassis 30. The distal end 34b of chassis arm 32 is equipped with a mechanism 35 (bolt, clasp, clamp, hook, etc.) for attaching chassis arm 32 to carrier assembly 22.

Carrier assembly 22 has a base portion or cart 36 including front wheels 38a (swivel castors, one of two are shown) and rear wheels 40a (one of two are shown). Wheels 38a and 40a permit carrier assembly 22 to be manually moved (pushed or pulled) around when carrier assembly 22 is not connected to chassis arm 32. It is convenient to use carrier assembly 22 to hold and/or store the cargo item in a garage, driveway, shed, etc., when it is not being used or transported.

Figure 4:
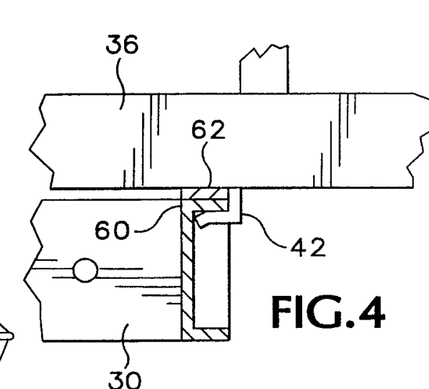
FIG. 4 is a partial cross-sectional view of the structure shown in FIG. 3, however, with the carrier assembly in the load position.

Cart 36 has an L-shaped hook or clip 42 that locks or engages a ledge or protrusion on the back edge of chassis 30, thereby securely holding the rear end of the carrier assembly down on the bed of the pickup truck. This feature is illustrated in FIG. 4 and will be discussed further below.

A rack 50, specifically designed to carry a pair of wave runners, 24a (one of two are shown), is carried on cart 36. A winch 52a is provided at the front end of rack 50 for pulling and securing the nose of wave runner 24a.

In the preferred embodiment, a plurality of racks, each designed to carry a different cargo item, may be used interchangeably on a generic cart. For example, rack 50 could be replaced with an alternate rack designed to carry a boat. The rest of the apparatus including cart 36, chassis arm 32 and the drive mechanism contained within chassis 30 may be used with any one of the interchangeable racks.

Figure 2A:
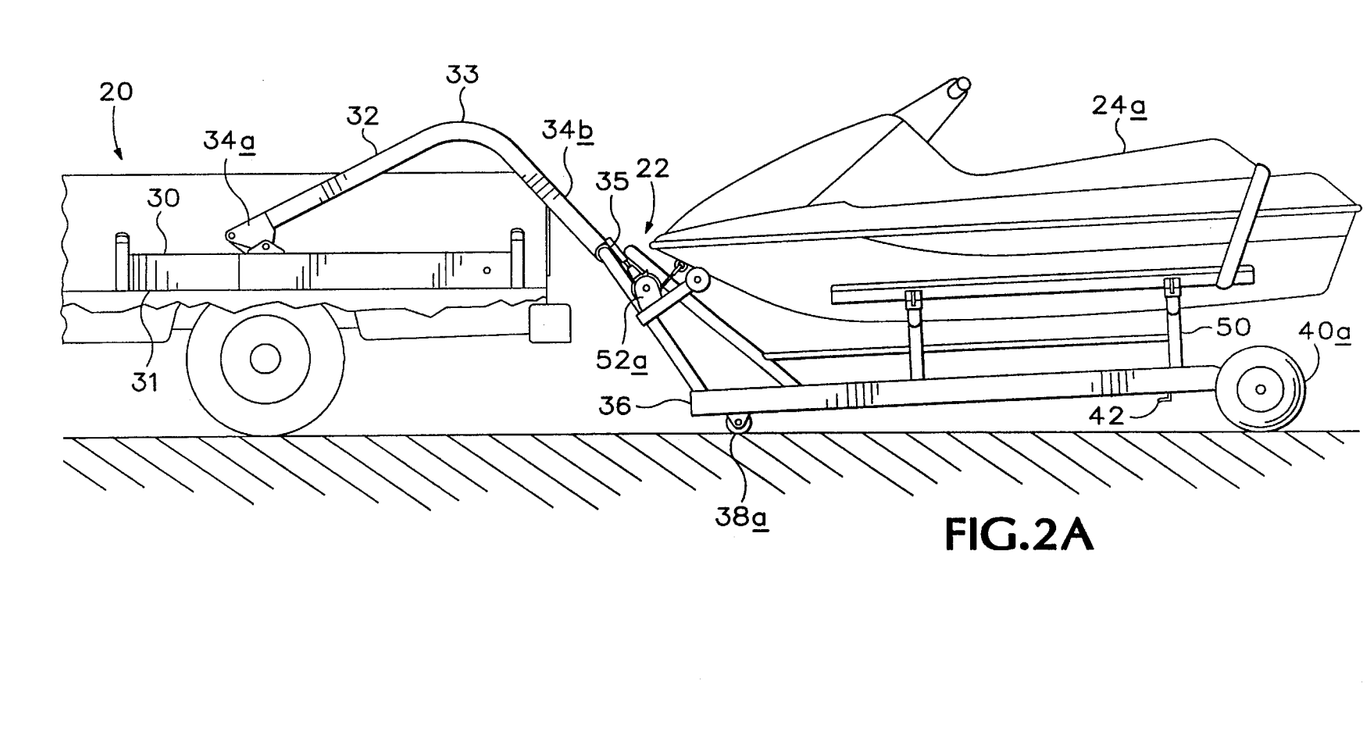
FIGS. 2A–2D show a series of side, partially cut-away, views of the rear end of a pickup truck and a preferred embodiment of the present invention being employed to load a wave runner into the back of the pickup truck.
Figure 2B:
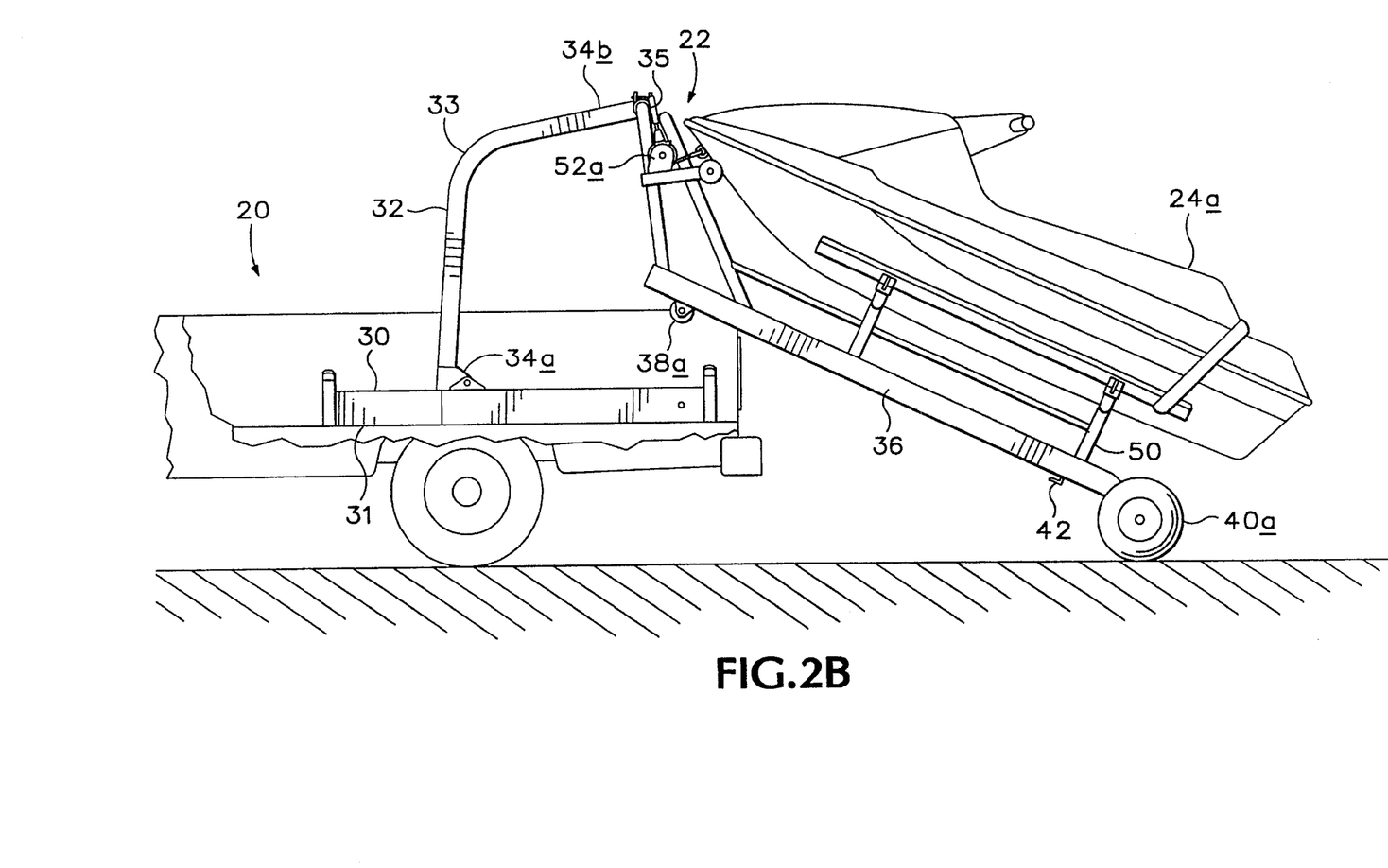
Figures 2C, 3:
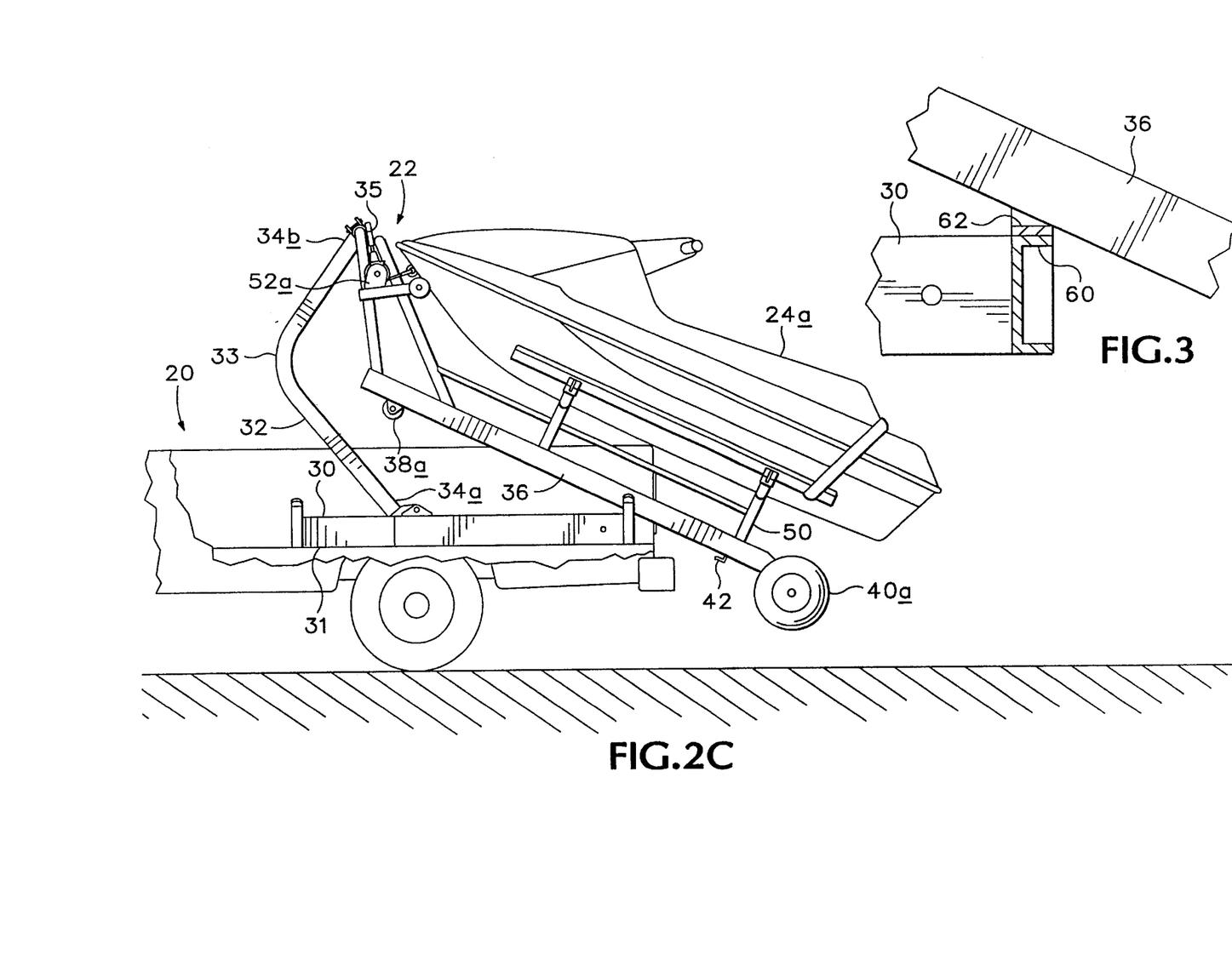
FIG. 3 is a partial side cross-sectional view of the rear end or edge of the chassis and a portion of the cart or carrier assembly in the process of being loaded into the back of the pickup truck.
Figure 2D:
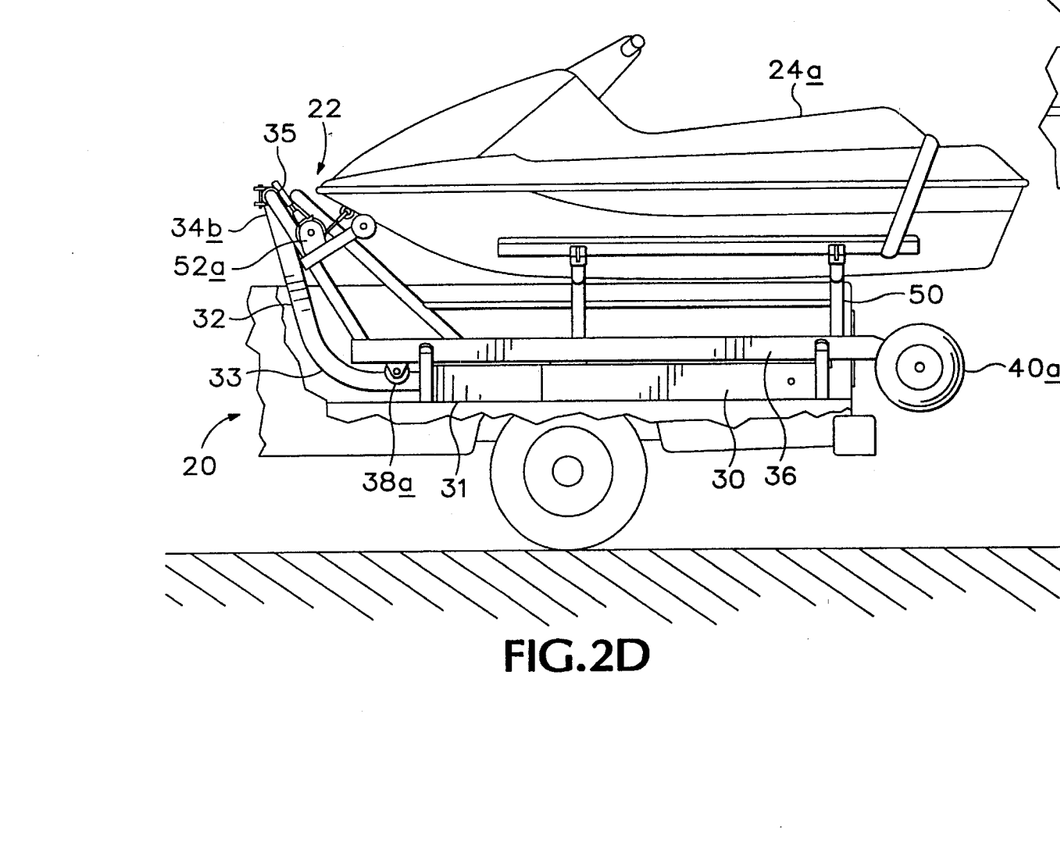

FIG. 2A illustrates an "unload position." FIGS. 2B and 2C illustrate intermediate loading positions which are reached by moving chassis arm 32 toward the front of pickup truck 20. As shown in FIG. 2C and in FIG. 3, during the loading; process, the bottom side of cart 36 slides on a back edge of chassis 30. FIG. 2D and FIG. 4 show the apparatus in its "load position" with carrier assembly 22 and wave runner 24a fully supported and secured on chassis 30 mounted on bed 31 of pickup truck 22.

FIGS. 3 and 4 relate to FIGS. 2C and 2D, respectively. Near a rear edge of chassis 30 is a ledge-like protrusion 60. A low-friction strip or guide block 62 is mounted on protrusion 60. As shown in FIGS. 2C and 3, during the loading process, the bottom side of cart 36 slides on low-friction strip 62. Hard plastic materials such as UHMW (ultra high molecular weight), preferably high density polyethylene, are suitable for strip 62. When carrier assembly 22 is completely loaded on chassis 30 mounted on bed 31 of pickup truck 20, hook or clip 42 on the bottom side of cart 36 hooks or latches onto protrusion 60, thereby locking the rear end of carrier assembly 22 in place on chassis 30 mounted on bed 31 of pickup truck 20.

Figure 5:
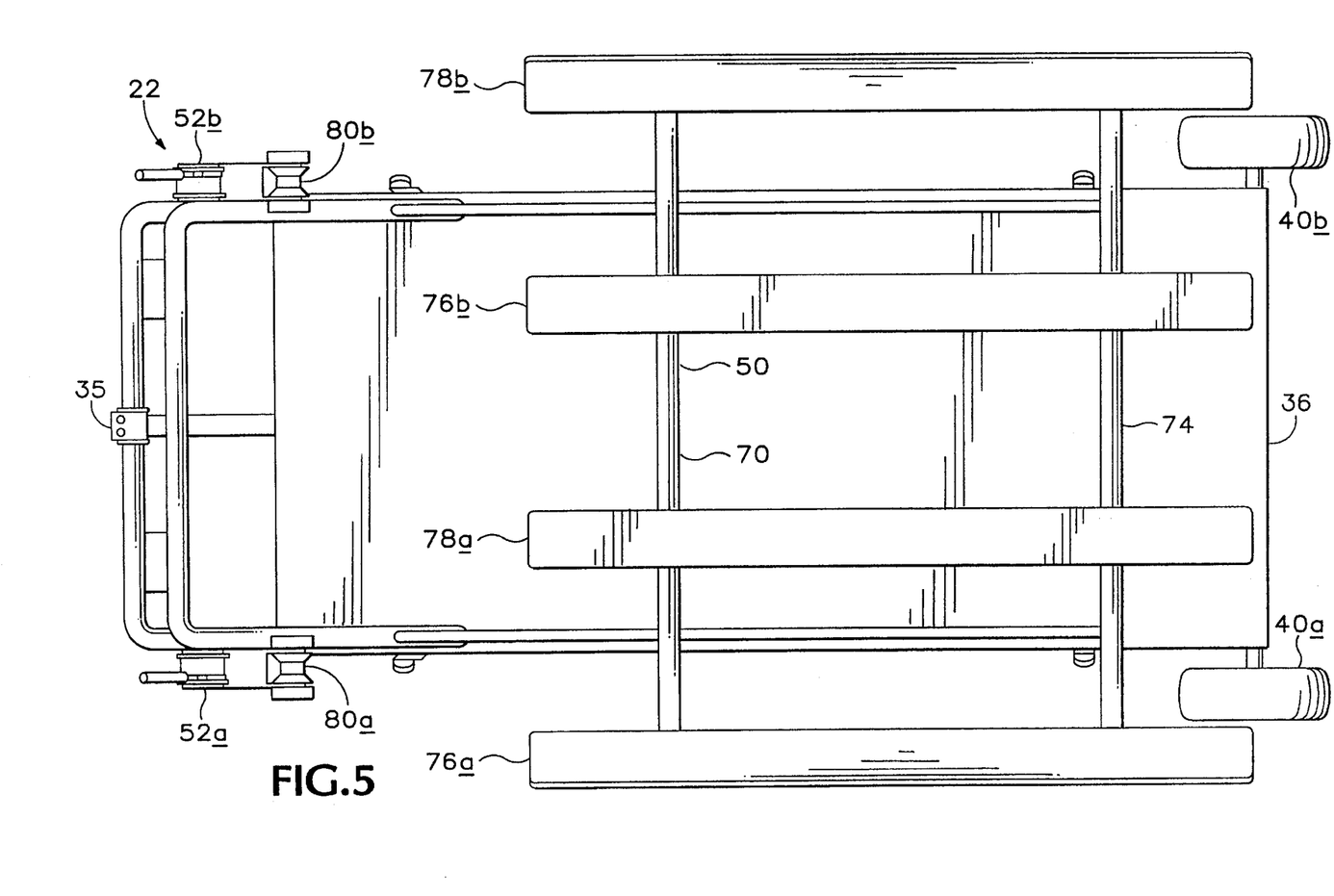
FIG. 5 is a top view of a carrier assembly which is designed to carry two wave runners side-by-side.
Figure 6:
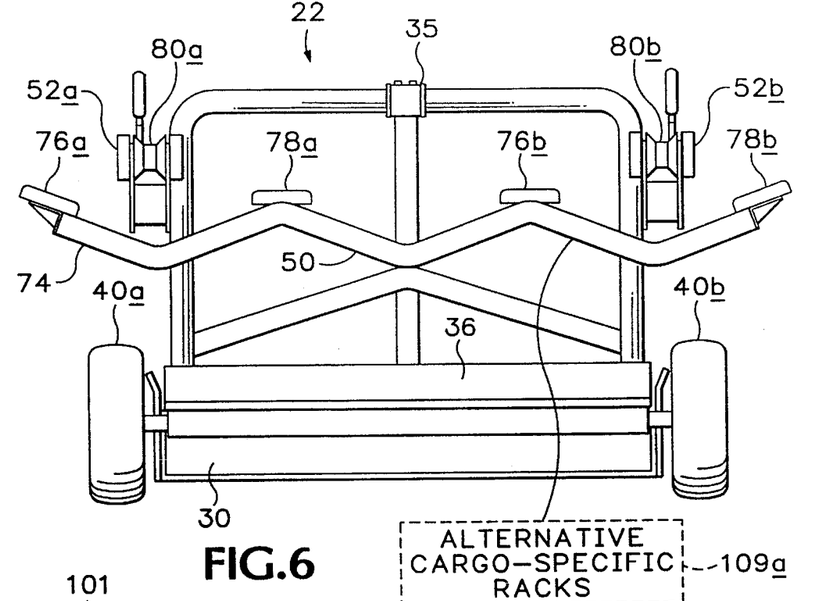
FIG. 6 is a rear view of the carrier assembly and chassis.
Figure 7:
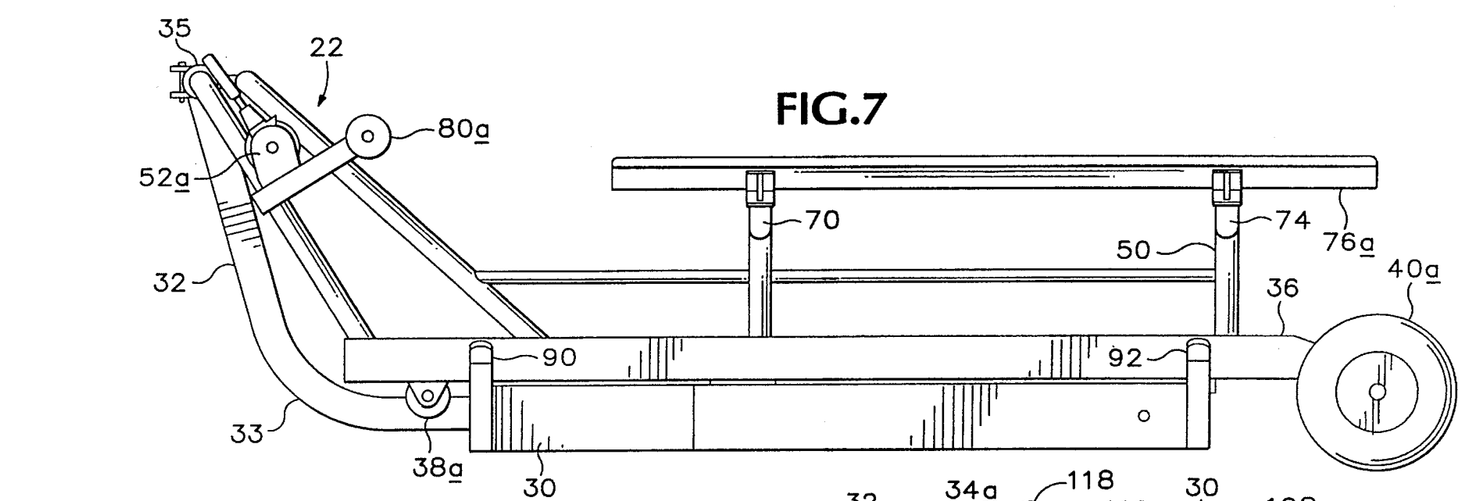
FIG. 7 is a side view of the carrier assembly shown in FIGS. 5 and 6 in the load position.

FIGS. 5, 6 and 7 illustrate different views of carrier assembly 22. As already explained, carrier assembly 22 has two primary components, generic cart 36 and cargo-specific rack 50. Rack 50 is designed to carry two wave runners side-by-side. The rack includes crossbars 70 and 74. As shown in the end view of FIG. 6, each of crossbars 70 and 74 is bent or angled at five points, creating four upper crests on which four longitudinal vehicle supports 76a, 78a, 76b and 78b are mounted. Wave runner 24a rests on longitudinal support rails 76a and 78a. When loading the wave runner onto rack 50, a strap (or cable) variably extending from winch 52a is attached to the nose of wave runner 24a and used to pull the wave runner onto the rack until the nose engages roller 80a. Similarly, on the other side of rack 50, winch 52b is used to pull a second wave runner onto longitudinal supports 76b and 78b until the nose of the wave runner engages roller 80b. An end view of carrier assembly 22 is shown in FIG. 6.

FIG. 7 shows carrier assembly 22 in the load position mounted on top of chassis 30. The position of carrier assembly 22 relative to chassis 30 and chassis arm 32 is the same in FIG. 7 as in FIG. 2D and 4 except the truck and wave runner are deleted. When carrier assembly 22 is in the load position, as shown in FIG. 7, the bottom side of cart 36 rests between guide posts 90 and 92 which are positioned at the front and rear ends, respectively, of chassis 30.

Figure 8:
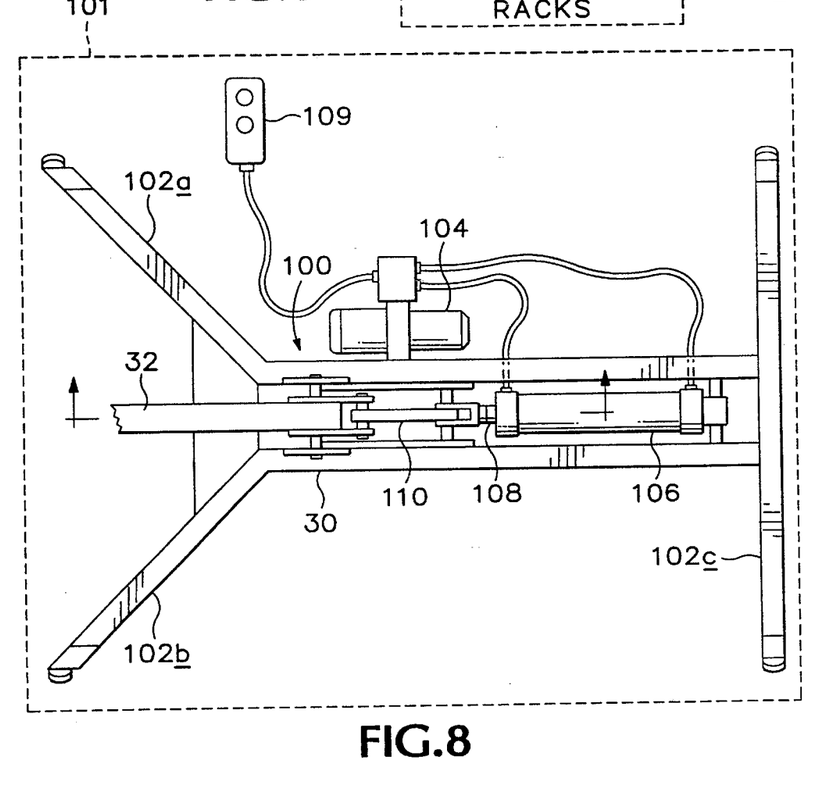
FIG. 8 is a top view of the frame and drive mechanism in a preferred embodiment of the present invention.
Figures 9, 10:
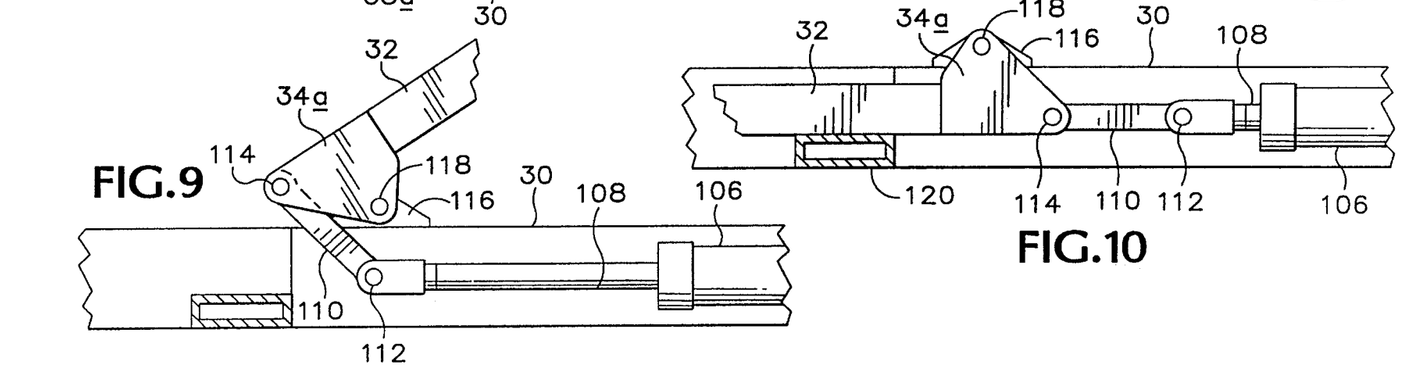
FIG. 9 is a partial side view of the drive mechanism shown in FIG. 8. Specifically, the articulating joint region of attachment between the hydraulically driven shaft and the chassis arm is shown. The chassis arm is oriented toward the unload position.
FIG. 10 is a partial side view of the joint region shown in FIG. 9. The chassis arm is shown in the load position.

FIGS. 8, 9 and 10 illustrate mechanics which are used to operate the apparatus, i.e., move chassis arm 32 between the load position and the unload position. FIG. 8 shows a top view of the chassis and drive system 100, most of which is contained in chassis 30 on bed 31 of pickup truck 20. Frame elements 102a, 102b and 102c are welded to each other forming chassis 30 which is rigidly bolted to bed 31 of pickup truck 20. Pump 104 drives hydraulic cylinder 106. Shaft structure 108 extends variably from cylinder 106. Note that a pneumatic cylinder could be used instead of hydraulic cylinder 106. An articulator 110 is attached to the distal end of shaft structure 108. The distal end of articulator 110 is pivotally connected to proximal end 34a of chassis arm 32. Control device 109 communicates with pump 104. A user can operate and control the entire apparatus by manipulating hand control device 109. The control device may communicate with the drive mechanism by wire or by radio signal telemetry. It is important that the operator be able to hold and operate control device 109 while standing at least several feet away from the truck. By substantially containing the drive mechanism within chassis 30 and by providing a control device which can be operated remote from the truck, the entire assembly can be safely used in a recreational setting.

In another embodiment of the invention, a plate or cover 101 (schematically shown in FIG. No. 8) is secured on top of chassis 30, thereby completely covering and concealing the drive mechanism regardless of what position chassis arm 32 and carrier assembly 22 are in.

As shown schematically in FIG. 6, alternative cargo-specific racks 109a may be interchangably mounted on cart 36 so that the same cart 36 can be used to load and carry different types of cargo.

FIGS. 9 and 10 focus in on the articulating joint between the drive mechanism and chassis arm 32. As shown in FIG. 9, hydraulic cylinder 106 alternately extends and retracts shaft 108 which is pivotally connected to articulator 110 at point 112. The other end (distal end) of articulator 110 is pivotally connected to proximal end 34a of chassis arm 32 at point 114. Proximal end 34a of chassis arm 32 has another pivot point 118 located behind pivot point 114. Proximal end 34a of chassis arm 32 is connected to mount structure 116 which protrudes above the top of chassis 30. It can be seen in FIGS. 9 and 10 that movement of chassis arm 32 is achieved by maintaining the location of pivot point 118 independent from any movement of shaft 108 in and out of hydraulic cylinder 106. This is in contrast to pivot points 112 and 114 which maintain a constant distance between each other, and move in conjunction with the movement of shaft structure 108, thereby causing chassis arm 32 to move between the load and unload positions. FIG. 9 shows the relative position of the pivot point and shaft structure when chassis arm 32 is in the unload position. FIG. 10 shows the same pivot points and shaft structure positions (retracted into cylinder 106) when chassis arm 32 is in the load position.

Preferred embodiments of the invention have been described in detail. However, it is readily apparent that numerous modifications may be made without departing from the spirit and scope of the invention as claimed below.

We claim:

1. An apparatus for loading and carrying cargo on the bed of a pickup truck comprising:

a chassis equipped for easy mount and dismount on the bed of a pickup track;

at least one hydraulic or pneumatic cylinder rigidly connected to the chassis and oriented generally along an axis extending between the front and rear ends of the track;

a shaft structure having a distal end variably extending from an end of the cylinder along said axis;

a power generator connected to the cylinder and operable to drive the shaft structure in and out of the cylinder along said axis;

a control device for controlling the power generator and movement of the shaft structure relative to the cylinder;

an arm having a proximal end and a distal end, the proximal end of the arm being pivotally connected to the chassis at one point and also pivotally connected to the distal end of the shaft structure at a second point, so that movement of the shaft structure along said axis substantially parallel to the ed of the pickup truck causes the arm to move to and from load and unload positions while the chassis remains stationary relative to the bed of the pickup truck; and a carrier assembly including a mechanism for detachably linking the carrier assembly to the distal end of the arm, and a rack sized and shaped to support a type of cargo, so that the cargo can be securely mounted on the rack and then loaded on the bed of the pickup truck by linking the carrier assembly to the distal end of the arm and manipulating the control device to drive the distal end of the arm toward the front end of the pickup truck until the carrier assembly and cargo is loaded completely and securely on the bed of the pickup truck.

2. The apparatus of claim 1 further comprising a cover on top of the chassis substantially concealing the cylinder, shaft and power generator.

3. The apparatus of claim 1 wherein the shaft moves in a direction substantially parallel to the bed of the pickup truck.

4. The apparatus of claim 1 wherein the carrier assembly includes a cart sized and shaped to carry any one of a plurality of cargo-specific racks so that the same cart can be used to load and carry different types of cargo by interchanging cargo-specific racks.

5. The apparatus of claim 1 wherein the carrier assembly has a front end and a rear end, and is equipped with a pair of wheels near the rear end so that the rear end of the carrier assembly can roll across the ground during the loading process.

6. The apparatus of claim 5 further comprising at least one wheel located toward the front of the carrier assembly so that the carrier assembly is mobile when it is unloaded from the pickup truck and detached from the arm.

7. The apparatus of claim 1 wherein the control device is operable remotely from the pickup truck.

8. The apparatus of claim 1 wherein the cylinder is a hydraulic cylinder.

9. The apparatus of claim 1 wherein the arm is has an elbow.

10. The apparatus of claim 1 further comprising a guide block mounted on a back edge of the bed of the pickup truck for guiding and permitting relatively low-friction sliding of the carrier assembly over the back edge of the pickup truck during the loading and unloading procedures.

11. An apparatus for loading and carrying cargo on the bed of a pickup truck comprising:

a chassis equipped for easy mount and dismount on the bed of a pickup truck;

at least one hydraulic or pneumatic cylinder rigidly connected to the chassis and oriented generally along an axis extending between the front and rear ends of the truck;

a shaft structure having a distal end variably extending from an end of the cylinder along said axis;

a power generator connected to the cylinder and operable to drive the shaft structure in and out of the cylinder along said axis;

a control device for controlling the power generator and movement of the shaft structure relative to the cylinder;

an arm having a proximal end and a distal end, the proximal end of the arm being pivotally connected to the chassis at one point and also pivotally connected to the distal end of the shaft structure at a second point, so that movement of the shaft structure toward the front end of the pickup truck causes the distal end of the arm to move toward the rear end of the pickup truck, and movement of the shaft structure toward the rear end of the pickup truck causes the distal end of the arm to move toward the front end of the pick up truck;

a carrier assembly including a mechanism for detachably linking the carrier assembly to the distal end of the arm, and a rack sized and shaped to support a type of cargo, so that the cargo can be securely mounted on the rack and then loaded on the bed of the pickup truck by linking the carrier assembly to the distal end of the arm and manipulating the control device to drive the distal end of the arm toward the front end of the pickup truck until the carrier assembly and cargo is loaded completely and securely on the bed of the pickup truck;

wherein the carrier assembly includes a generic cart designed to carry any one of a plurality of cargo-specific racks so that the same apparatus can be used to load and carry different types of cargo by interchanging cargo-specific racks; and wherein one of the racks is sized and shaped to carry two wave runners.

* * * * *